United States Patent
McKay et al.

(10) Patent No.: US 9,287,912 B2
(45) Date of Patent: Mar. 15, 2016

(54) MULTIMODE RECEIVER WITH COMPLEX FILTER

(71) Applicant: MStar Semiconductor, Inc., Hsinchu Hsien (TW)

(72) Inventors: Thomas McKay, Boulder Creek, CA (US); Jonathan Gowing, Santa Cruz, CA (US); Stephen Allott, Scotts Valley, CA (US); Cyril Valadon, Letchworth Garden (GB)

(73) Assignee: MStar Semiconductor, Inc., Hsinchu Hsien (TW)

( * ) Notice: Subject to any disclaimer, the term of this patent is extended or adjusted under 35 U.S.C. 154(b) by 32 days.

(21) Appl. No.: 13/840,266

(22) Filed: Mar. 15, 2013

(65) Prior Publication Data

US 2014/0270021 A1 Sep. 18, 2014

(51) Int. Cl.
| | |
|---|---|
| *H04B 1/10* | (2006.01) |
| *H04B 1/12* | (2006.01) |
| *H04B 1/00* | (2006.01) |
| *H04B 1/18* | (2006.01) |
| *H04L 27/26* | (2006.01) |

(52) U.S. Cl.
CPC ............ *H04B 1/1027* (2013.01); *H04B 1/0067* (2013.01); *H04B 1/123* (2013.01); *H04B 1/18* (2013.01); *H04L 27/2647* (2013.01)

(58) Field of Classification Search
CPC .... H04B 1/005; H04B 1/0053; H04B 1/0067; H04B 1/3805; H04B 1/401; H04B 1/1036; H04B 1/123; H04B 1/10; H04B 1/1027; H04B 1/18; H04W 88/06; H04W 88/10; H04N 5/46; H04L 27/2647
USPC ................. 375/324, 328, 340, 316, 346, 350; 455/522.1, 553.1
See application file for complete search history.

(56) References Cited

U.S. PATENT DOCUMENTS

| | | | | |
|---|---|---|---|---|
| 5,764,171 | A * | 6/1998 | Stikvoort | H03C 3/40 327/215 |
| 6,643,502 | B1 * | 11/2003 | Van De Plassche | H04N 5/4446 348/735 |
| 6,678,340 | B1 * | 1/2004 | Khlat | H03D 3/007 375/350 |
| 6,754,508 | B1 * | 6/2004 | Pau | H04B 1/405 455/255 |
| 7,120,415 | B2 * | 10/2006 | Minnis | H04B 1/406 375/322 |
| 7,251,467 | B2 * | 7/2007 | Sendonaris | H04L 27/0014 455/255 |
| 7,327,406 | B2 * | 2/2008 | Utsunomiya | H03D 7/161 348/725 |
| 7,386,278 | B2 * | 6/2008 | Sato | H04B 1/006 455/73 |
| 7,486,338 | B1 * | 2/2009 | Wyszynski | H04N 5/4446 327/557 |
| 7,570,723 | B2 * | 8/2009 | Buda | H03D 3/007 375/257 |
| 8,140,043 | B2 * | 3/2012 | Suominen | H03D 3/007 455/302 |
| 8,150,339 | B2 * | 4/2012 | Cassia | H03F 1/0244 455/118 |
| 2002/0136288 | A1 * | 9/2002 | McCarty, Jr. | H03H 17/0219 375/232 |
| 2003/0007583 | A1 * | 1/2003 | Hilton | H04L 25/03038 375/350 |

(Continued)

*Primary Examiner* — Sophia Vlahos
(74) *Attorney, Agent, or Firm* — Edell, Shapiro & Finnan, LLC (57) ABSTRACT

One aspect of the present invention includes a radio frequency (RF) receiver having a first mixer and a second mixer. The first mixer may be an I-mixer and the second mixer a Q-mixer for downconverting the received RF signal. An impedance circuit is disposed between the first mixer and the second mixer to decouple the channels. In another aspect of present invention, the RF receiver includes a digital filter having at least one complex coefficient. The digital filter exhibits asymmetrical frequency response, and may be used to compensate the asymmetrical frequency response of another filter in the RF receiver.

10 Claims, 11 Drawing Sheets

(56) References Cited

U.S. PATENT DOCUMENTS

| | | | |
|---|---|---|---|
| 2004/0142723 A1* | 7/2004 | Shippee | H04W 88/06 455/552.1 |
| 2005/0070325 A1* | 3/2005 | Bellaouar | H04B 1/30 455/550.1 |
| 2005/0220224 A1* | 10/2005 | Dornbusch | H03H 7/21 375/324 |
| 2007/0072576 A1* | 3/2007 | Sjoland | H03D 7/125 455/323 |
| 2008/0139149 A1* | 6/2008 | Mu | H03D 7/1441 455/200.1 |
| 2012/0293267 A1* | 11/2012 | Rafi | H03F 3/19 330/296 |
| 2013/0136211 A1* | 5/2013 | Jussila | H04B 1/0075 375/340 |

* cited by examiner

MULTIMODE RECEIVER WITH COMPLEX FILTER

FIELD OF INVENTION

The present invention relates to radio frequency (RF) receiver having mixers in the field of RF communications equipment such as cell phones and wireless LAN receiver.

BACKGROUND OF THE INVENTION

The present invention is related to U.S. Pat. No. 8,121,577, which is incorporated by reference herein.

RF communications systems include RF receivers for receiving a desired RF signal on a specific RF channel (e.g., a desired bandwidth and a desired RF center frequency). One function of the RF receiver is to reject RF signals at frequencies other than those within the desired bandwidth of the desired RF channel. RF signals at bandwidths near the desired bandwidths are particularly troublesome.

One type of RF receiver is called super-heterodyning, in which received RF signals are mixed using mixers with a local oscillator (LO) signal to down convert the received RF signals into lower frequency signals, which are known as intermediate frequency (IF) signals. Generally, it is easier to filter out unwanted signals at IF frequencies than at higher RF frequencies.

Another type of RF receiver is called direct downconversion receiver. In this type of receiver, the received RF is mixed with LO signal at the carrier frequency of the received RF signal, and down converts the received signal directly to a baseband signal.

One type of down conversion using mixers is called quadrature down conversion. Quadrature down conversion produces two down-converted signals from the received RF signal. The down-converted signals are orthogonal, or 90 degrees out of phase, with each other. An in-phase mixer (or I-mixer) mixes the received RF signal with a first or first set of local oscillator signals, producing a real down-converter signal (I signal). A quadrature mixer (or Q-mixer) mixes the received RF signal with a second or second set of local oscillator signals, producing an imaginary down-converter signal (Q signal). The first and second local oscillator signals (or sets of local oscillator signals) are 90 degrees out of phase.

However, mixers have a characteristic that produces image signals in addition to desired signals. Image signals may be removed by RF filtering, IF filtering, or both. Bandpass filtering may be used to pass desired signals and remove interfering signals. Notch filtering may be used to target and reduce interfering signals at specific frequencies.

Another issue with RF receivers is sideband asymmetry in gains (e.g., magnitude). The received RF signal within the desired bandwidth may experience different gains as frequency varies. For example, the received RF signal toward the upper side of the bandwidth is amplified differently than toward the lower side of the bandwidth.

The quality factor of a bandpass filter is a measure of the effectiveness of the filter at removing interfering signals at nearby frequencies, and is the bandwidth of the filter divided by the center frequency of the filter.

U.S. Pat. No. 8,121,577 introduced a filter embedded in the mixers. In that system, the output of a mixer is terminated with a polyphase reactive circuit, such as a capacitor. A mixer mixes RF input signals with LO signals and translates the impedance of the polyphase reactive circuit into the RF input impedance of the mixer. When fed from a high impedance source, such as a current source, the mixer provides a high quality factor (Q) impedance response associated with an impedance peak. The high-Q impedance response is used as a high-Q RF bandpass filter in a receive path upstream of down conversion, which improves receiver selectivity and replaces surface acoustic wave (SAW) or other RF filters.

For wireless telecommunication applications, a receiver receives RF signals set under wireless transmission standards commonly known as 2G, 3G, and 4G. 2G is known as the second generation cell phone. The standard is GSM (Global System for Mobile Communications, originally Groupe Spécial Mobile) set by the European Telecommunications Standards Institute (ETSI). 3G is the third generation standard set by International Mobile Telecommunications-2000 (IMT-2000) specifications under the International Telecommunication Union. The $4^{th}$ generation, or 4G, includes LTE or Long Term Evolution standard. The terms 2G, 3G, and 4G may not be officially defined, and each may include various wireless telecommunication standards. For example, LTE and WiMax may both claim to be 4G technology. 3G standards may include, Universal Mobile Telecommunications System (UMTS), WCDMA, and TD-SCDMA used in China.

Modern cell phones are designed to accommodate a plurality of the standards discussed above.

SUMMARY OF THE INVENTION

One aspect of the present invention includes a radio frequency (RF) receiver supporting multiple communication modes, such as 2G and 3G. In 2G mode, the mixers operate at a high voltage. In particular, the local oscillator signals operate at a voltage 2× or more of the 3G mixers.

In another aspect of the present invention includes a radio frequency (RF) receiver having a first mixer and a second mixer. The first mixer may be an I-mixer and the second mixer a Q-mixer for downconverting the received RF signal. An impedance circuit is disposed between the first mixer and the second mixer to decouple the channels. Such decoupling improves the frequency response symmetry of the RF receiver.

In another aspect of present invention, the RF receiver includes a digital filter having at least one complex coefficient. The digital filter exhibits asymmetrical frequency response, and may be used to compensate the asymmetrical frequency response of another filter in the RF receiver. The components of the another filter include the mixers and a polyphase reactive circuit coupled to the output of the mixers.

DETAILED DESCRIPTION OF THE SYSTEM

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not specifically included in the embodiments.

In one aspect of present invention, the RF receiver supports multiple wireless transmission standards, such as 2G and 3G. For example, the receiver supports multiple modes without having to disable one set of the mixers, and/or disable the clocks going into the mixers.

Figure 1:
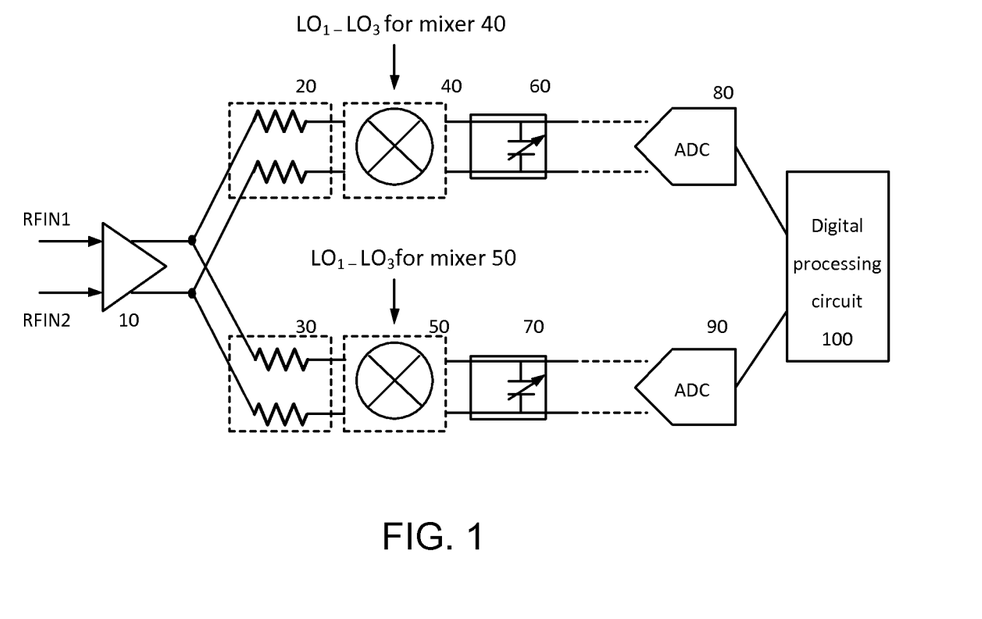
FIG. 1 illustrates an embodiment of present invention.

FIG. 1 illustrates the first embodiment (200), which is an RF receiver operating on differential signals. A front end of the RF receiver 200 includes a low-noise amplifier (LNA) 10 which amplifies received differential RF input signal (RFIN1 and RFIN2). The RF input signal may be received by, e.g., an antenna (not shown) of over-the-air wireless signal. In this embodiment, the RF input signals is a cell phone signal. The RF input signals may also be received from a cable or optical cable and may be, e.g., TV signals.

The output of the LNA 10 is coupled to the first set of mixers 40 via impedance circuit 20, and is coupled to a second set of mixers 50 via impedance circuit 30. While LNA 10 is shown as a single circuit in this embodiment, it is understood in the art that LNA 10 may in fact includes a plurality of low-noise amplifiers. For example, one low-noise amplifier may individually couples to each of the plurality of mixers included on the first set of mixers 40, and so forth.

The first set of mixers 40 includes an I-mixer and a Q-mixer, and is configured to receive 2G RF signal. The second set of mixers 50 also includes an I-mixer and a Q-mixer, and is configured to receive 3G RF signals.

For example, Universal Mobile Telecommunications System (UMTS) networks, commonly known as 3G system, use 1850-1910 MHz for upload and 1930-1990 MHz for download in the United States (WCDMA 1900). Thus, the second set of mixers 50 may be tuned to this frequency band. A 2G or GSM system in the United State may operate in GSM-850 band (824.2-849.2 MHz for upload and 869.2-894.2 MHz for download). The first set of mixers 40 may be designed to operate in this frequency band.

The first set of mixers 40 is terminated by a polyphase reactive circuit 60. The second set of mixer 50 is terminated by a polyphase reactive circuit 70.

Figure 2:
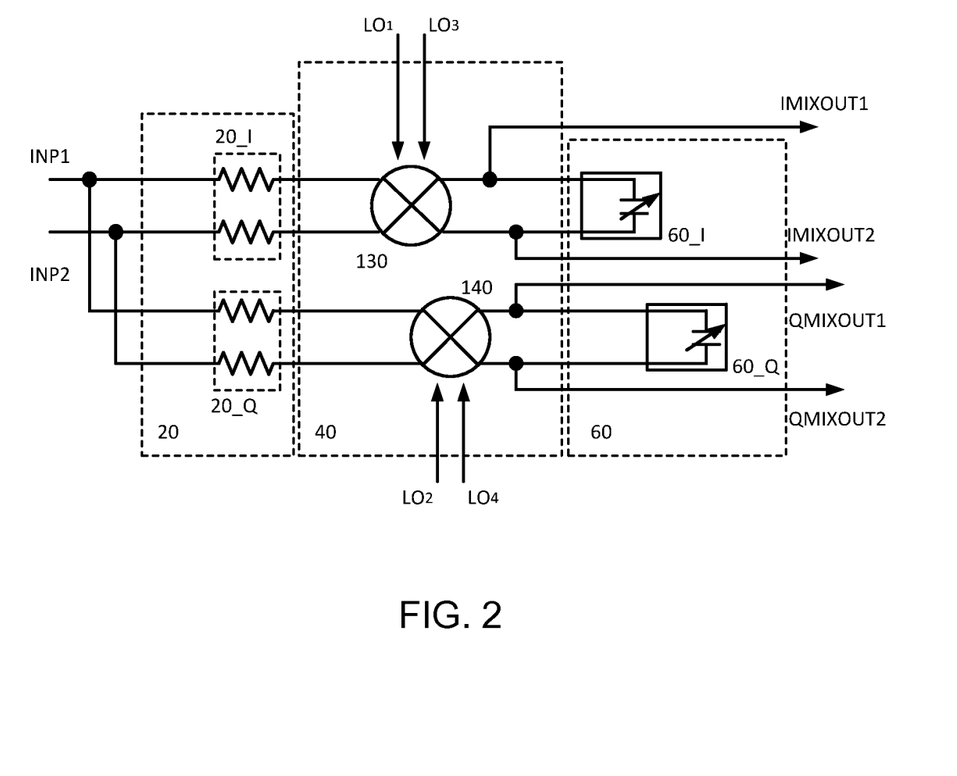
FIG. 2 illustrates the impedance circuit 20, mixers 40, and polyphase reactive circuit 60 of the embodiment.

FIG. 2 illustrates a more detailed view of the first set of mixers 40 and polyphase reactive circuit 60. The first set of mixers 40 includes an I-mixer 130 and a Q-mixer 140. The I-mixer 130 and Q-mixer 140 receives a differential input at INP1 and INP2. The I-mixer 130 outputs a differential output at IMIXOUT1 and IMIXOUT2. The Q-mixer 140 outputs a differential output at QMIXOUT1 and QMIXOUT2. The output at IMIXOUT1 and IMIXOUT2 are terminated by a polyphase reactive circuit 60_I, and the output at QMIXOUT1 and QMIXOUT2 are terminated by a polyphase reactive circuit 60_Q. That is, the polyphase reactive circuit 60 includes polyphase reactive circuit 60_I and polyphase reactive circuit 60_Q.

The second set of mixers 50 and polyphase reactive circuit 70 are similar as depicted in FIG. 2.

The I-mixer 130 mixes the received signal with a first local oscillator signal $LO_1$ having a frequency LO. The Q-mixer 140 mixes the amplified signal with a second local oscillator signal $LO_2$ also of frequency LO. The first local oscillator signal $LO_1$ and the second local oscillator signal $LO_2$ are approximately 90 degrees out of phase.

The I-mixer 130 further mixes the amplified signal with a third local oscillator signal $LO_3$ having a frequency LO. The Q-mixer 140 further mixes the amplified signal with a forth local oscillator signal $LO_4$ also of frequency LO. The third local oscillator signal $LO_3$ is approximately 90 degrees out of phase with the second local oscillator signal $LO_2$. The forth local oscillator signal $LO_4$ is approximately 90 degrees out of phase with the third local oscillator signal $LO_3$.

Figure 3:
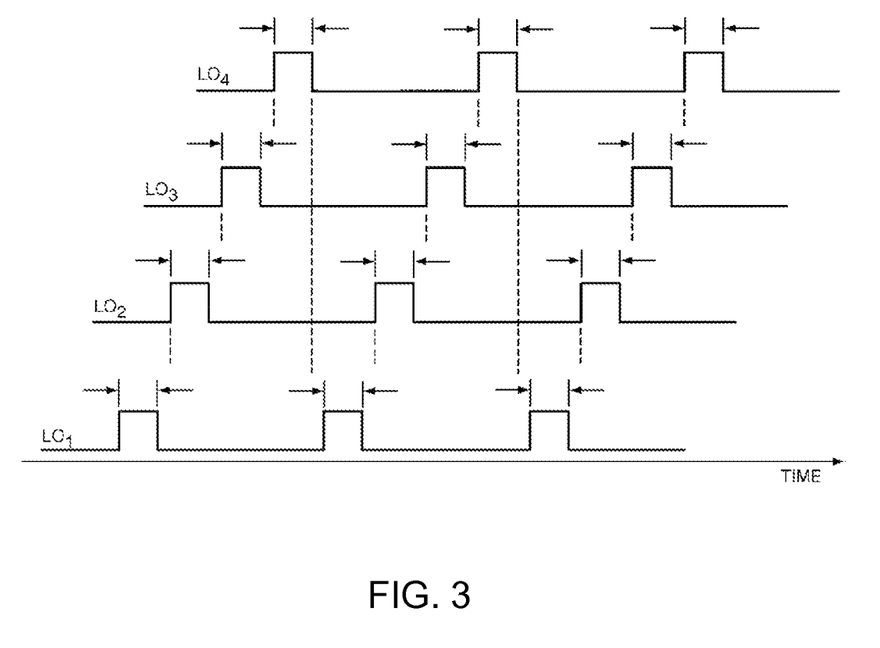
FIG. 3 illustrates the 4-phase local oscillator signals $LO_1$-$LO_3$ of the embodiment.

FIG. 3 illustrates the four out-of-phase local oscillator signals. To provide proper isolation between the phases, only one of the local oscillator signals $LO_1$, $LO_2$, $LO_3$, and $LO_4$ is active at any given time.

For convenience, the period when $LO_1$ is active is called phase 1. The period when $LO_2$ is active is called phase 2. The period when $LO_3$ is active is called phase 3. The period when $LO_4$ is active is called phase 4.

Figure 4:
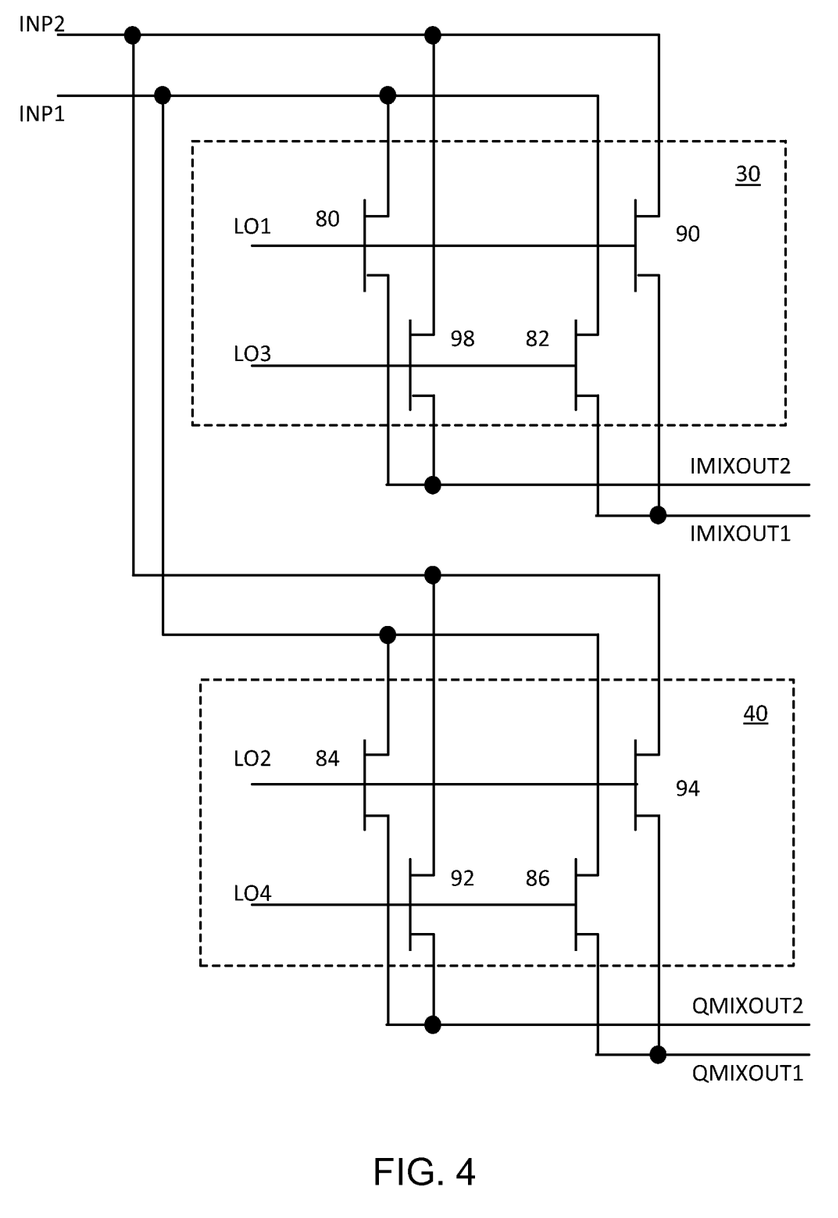
FIG. 4 illustrates an embodiment of the I-mixer 130 and Q-mixer 140.

FIG. 4 illustrates an embodiment of the I-mixer 130 and Q-mixer 140. The mixers are differential switching passive mixers using field effect transistors (FETs) as switching elements. The first mixer input INP1 is coupled to the drains of a first in-phase transistor 80, a second in-phase transistor 82, a first quadrature-phase transistor 84, and a second quadrature-phase transistor 86. The second mixer input INP2 is coupled to the drains of a third in-phase transistor 98, a fourth in-phase transistor 90, a third quadrature-phase transistor 92, and a fourth quadrature-phase transistor 94.

The local oscillator signal $LO_1$ is coupled to the gates of the first in-phase transistor 80 and the fourth in-phase transistor 90. The local oscillator signal $LO_3$ is coupled to the gates of the third in-phase transistor 98 and the second in-phase transistor 82.

The local oscillator signal $LO_2$ is coupled to the gates of the first quadrature-phase transistor 84 and the fourth quadrature-phase transistor 94. The local oscillator signal $LO4$ is coupled to the gates of the third quadrature-phase transistor 92 and the second quadrature-phase transistor 86.

The output signal IMIXOUT1 is coupled to the sources of the fourth in-phase transistor 90 and the second in-phase transistor 82. The output signal IMIXOUT2 is coupled to the sources of the first in-phase transistor 80 and the third in-phase transistor 98. The output signal QMIXOUT1 is coupled to the sources of the fourth quadrature-phase transistor 94 and the second quadrature-phase transistor 86. The output signal IMIXOUT2 is to the sources of the first quadrature-phase transistor 84 and the third quadrature-phase transistor 92.

The mixing process down converts the received RF signal. In a direct downconversion receiver, the mixers 130 and 140 output down-converted signals at the baseband frequency of the received signal. In another type of receiver, the down-converted signals are at an intermediate frequency (IF).

In this embodiment, the first set of mixers (2G) is configured to receive 2G wireless RF signals. The 2G standard is the earliest digital wireless transmission standard, and lacks the advancement of later standards. Thus, the 2G mixer may be configured to operate at higher voltage to improve performance. Thus, the local oscillator signals $LO_{1-3}$ here operate at a higher voltage than the oscillator signals $LO_{1-3}$ for the second set of mixers configured to receive 3G wireless RF signals. For example, the local oscillator signals $LO_{1-3}$ (2G)

for the first set of mixers operates at 1.2 V swing, and the local oscillator signals $LO_{1-3}$ for the second set of mixers (3G) operates at 2-2.4 V swing.

Moreover, SAW filters are not needed to operate in 2G mode. Thus this embodiment is an example of SAW-less 2G receiver.

The output nodes of the mixers are coupled or terminated by polyphase reactive circuits (FIG. 2). At phase 1, RFIN1 is coupled to one end of the polyphase reactive circuit 60_I. At phase 3, RFIN2 is coupled to the other end of the polyphase reactive circuit 60_I. At phase 2, RFIN1 is coupled to one end of the polyphase reactive circuit 60_Q. At phase 4, RFIN2 is coupled to the other end of the polyphase reactive circuit 60_Q.

Figure 5:
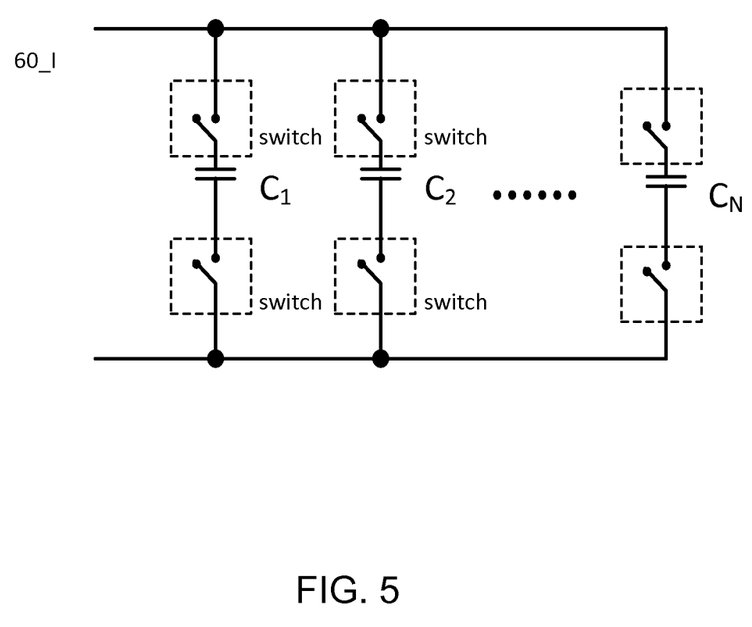
FIG. 5 illustrates a portion of an embodiment of the polyphase reactive circuit 60.

In this embodiment, the polyphase reactive circuit is a capacitor, and, in particular, a variable capacitor. FIG. 5 illustrates an embodiment of polyphase reactive circuit 60_I, including a plurality of switch capacitors. Capacitors $C_1$, $C_2$, and $C_N$ are illustrated. The capacitance value of polyphase reactive circuit 60_I can be adjusted by switching in or out the capacitors $C_1$, $C_2$, and $C_N$. Moreover, each of the capacitors $C_1$, $C_2$, and $C_N$ may vary greatly from the other to increase the range of total capacitance. For example, the value of capacitor $C_1$ may be twice or greater than the value of capacitor $C_2$.

Other types of polyphase reactive circuit may be used. For example, the polyphase reactive circuit may be a transconductance circuit.

As provided in U.S. Pat. No. 8,121,577, the LNA 10, first set of mixers 40 (or second set of mixers 50), and the terminating polyphase reactive circuit 60 (or 70) form a filter and can be adopted as part of the overall design. For ease of reference, this filter is identified as a radio frequency filter herein.

Downstream from the mixers, as is well known in the art, the down-converted signals IMIXOUT1, IMIXOUT2, QMIXOUT1, and QMIXOUT2 may be further amplified and filtered as required by the design (not shown). The analog signals are then converted to digital domain by analog-to-digital converters (ADCs) 80 and 90. The ADCs 80 and 90 output the received RF signals in digital domain (i.e., I/Q samples). As is known in the art, the I/Q samples may be described mathematically as complex numbers. In the digital domain, the RF signals or I/Q samples may be further processed and demodulated to obtain data carried by the received RF signal. The digital processing circuit (e.g., a baseband processor) 100 performs these functions.

FIG. 2 illustrates an impedance circuit 20 includes impedance circuit 20_I disposed between LNA 10 and the I-mixer 130. The impedance circuit 20_Q disposed between LNA 10 and the Q-mixer 140. The impedance circuit is, e.g., a passive impedance (resistor). These impedance circuits improve decoupling between I and Q channels.

As discussed above, one issue with RF receiver is frequency response asymmetry (e.g., magnitude). The inventors found that by adding the impedance circuits to decouple the I and Q channels, the frequency response symmetry is improved.

In one aspect of present invention, when in 3G mode, the first set of mixers 40 (configured for 2G) is not selected. The oscillator signals $LO_1$-$LO_3$ are disable to disable the first set of mixer 40.

Further, the impedance circuits may be variable (which are known in the art), and may be dynamically set to improve the decoupling of the I and Q channels. For example, the system may run a diagnostic routine at each power-up and set the impedance circuits individually to achieve the best decoupling.

Figure 6:
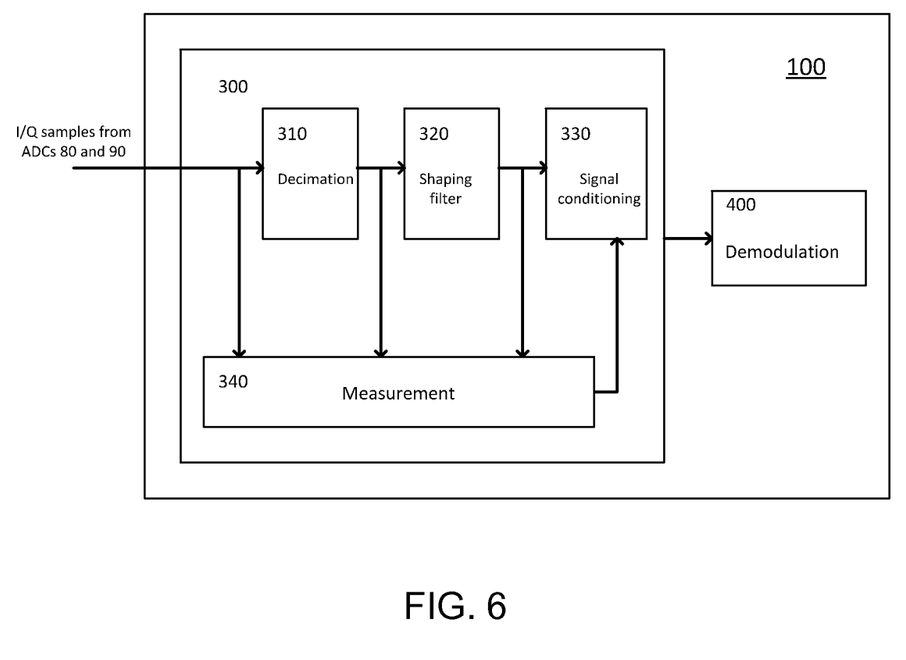
FIG. 6 illustrates a digital processing circuit 100 including a digital front end or DFE module 300 and a demodulation unit 400.

In another embodiment, the digital processing circuit 100 includes a digital complex filter to correct frequency response asymmetry (e.g., with regard to magnitude). In one aspect of present invention, the digital complex filter compensates frequency response asymmetry caused by another filter to achieve symmetry.

For example, as provided in U.S. Pat. No. 8,121,577, the LNA 10, first set of mixers 40 (or second set of mixers 50), and the terminating polyphase reactive circuit 60 (or 70) form the radio frequency filter. The digital complex filter may be used to compensate frequency response asymmetry resulted from the radio frequency filter.

As illustrated in FIG. 6, the digital processing circuit 100 includes a digital front end or DFE module 300 and a demodulation unit 400. The DFE module 300 processes the digital I/Q samples from the ADCs 80 and 90 such that they are in a format (sample rate, bit-width, etc.) suitable for the demodulation unit 400, which demodulates the RF signal and retrieves the information carried by the received RF signals. The circuits discussed above, such as LNA 10 and mixers 40 and 50, are considered as the analog portion of front end.

The DFE module 300 includes a decimation unit 310 receiving the digital I/Q samples from the ADCs 80 and 90, which typically operate at a rate which is much larger than the symbol/baud rate. Thus, the input samples are first decimated in decimation unit (e.g., including hardware circuit) 310. The decimation unit 310 reduces the sample rate from that corresponding to the ADCs 80 and 90 to one which is sufficient to accurately represent the signal to be retrieved but is as low as possible in order to minimise the implementation complexity of the following processing stages. A number of different implementations are possible for the decimation unit 310. For example, Cascaded Integrator Comb (CIC) architecture is often used as it can be implemented without using multipliers which are costly in terms of area and power consumption. The signal at the output of the decimation stage is still at a rate higher than the symbol/baud rate but the over-sampling factor is then significantly lower than that associated with the output of the ADC. The oversampling factor will typically be in the range of 2 to 5.

The design of a decimation unit is well known in the art and thus, is not further discussed here.

The shaping filter (e.g., including hardware circuit) 320 applies any filtering that is required to shape the frequency response of the part of the received signal which contains the information to be retrieved. For example, in the case of WCDMA signals, it is typical to filter the received signal with a filter having a Root-Raised Cosine (RRC) response in order to match that applied by the transmitter. The shaping filter 320 isn't necessarily implemented as a single filter but can support architectures with multiple stages of filtering. It is also possible for the different stages to be implemented using different architectures, i.e. some of the stages could use a Finite Impulse Response (FIR) approach and could be combined with Infinite Impulse Response (IIR) stages. Combining multiple filtering stages can be beneficial in terms of implementation complexity as it may help reduce the total number of arithmetic operations to perform.

Figure 7:
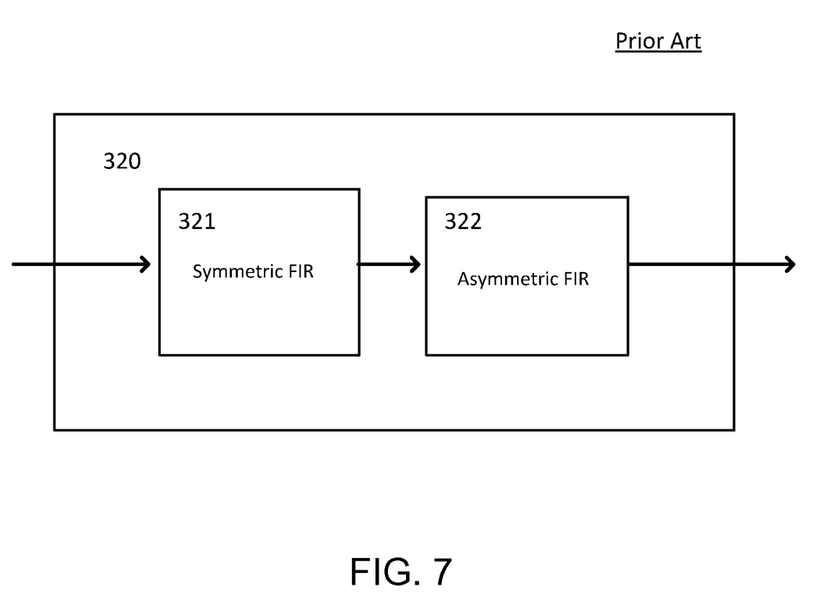
FIG. 7 illustrates the prior art shaping filter 320 including a cascade of a symmetric FIR 321 and an asymmetric FIR 322.

FIG. 7 shows a typical prior-art implementation where the shaping filter 320 is implemented as a cascade of a symmetric FIR 321 and an asymmetric FIR 322. (Symmetric and asymmetric filters are known in the art and should not be confused as having symmetric and asymmetric frequency response. As discussed below, both symmetric and asymmetric filters have symmetrical frequency response.)

Since both filters are linear operators, the order of these filtering stages doesn't change the overall response. Moreover, these filters use real-valued coefficients in prior-art solutions. For the symmetric filter 321, the N coefficients satisfy the following relationship:

When N is even:

$$h(i)=h(N-1-i) \text{ for } i \in \{0,\ldots,(N/2)-1\}$$

When the number of coefficients is odd, a similar but slightly different relationship holds:

$$h(i)=h(N-1-i) \text{ for } i \in \{0,\ldots,(N-1)/2\}$$

These relationships can then be used in order to reduce the number of multiplications which are required in the implementation of the filtering operations. In the case of an even number of coefficients, the number of multiplications can be halved. Hence, the use of a symmetric FIR architecture provides significant computational advantages when compared to an asymmetric FIR with the same number of taps. However, symmetric FIR filters are such that the phase response in the frequency domain is always linear (i.e. they have a constant group delay). Since the coefficients for both the symmetric FIR 321 and the asymmetric FIR 322 are real-valued, the magnitude of the frequency response of the shaping filter 320 will always be symmetric and therefore, the prior art solutions cannot correct asymmetric frequency response.

Figure 8:
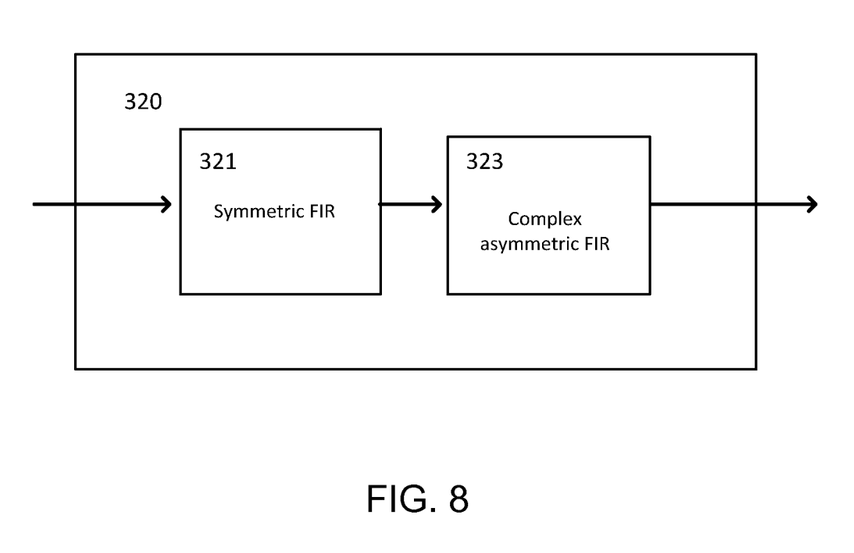
FIG. 8 illustrates an embodiment of the shaping filter 320 having a complex asymmetric FIR filter 323.

In this embodiment, at least one of the component filtering stages is implemented with complex-valued coefficients. As a result, the shaping filter 320 has a frequency response which isn't symmetric in magnitude. In FIG. 8, the asymmetric FIR filter 322 is replaced with a complex asymmetric FIR filter 323 which uses complex-valued coefficients. Having complex-valued coefficients makes it possible for the shaping filter 320 to implement a frequency response which is non-linear for the phase and is asymmetric for the magnitude.

Figure 9:
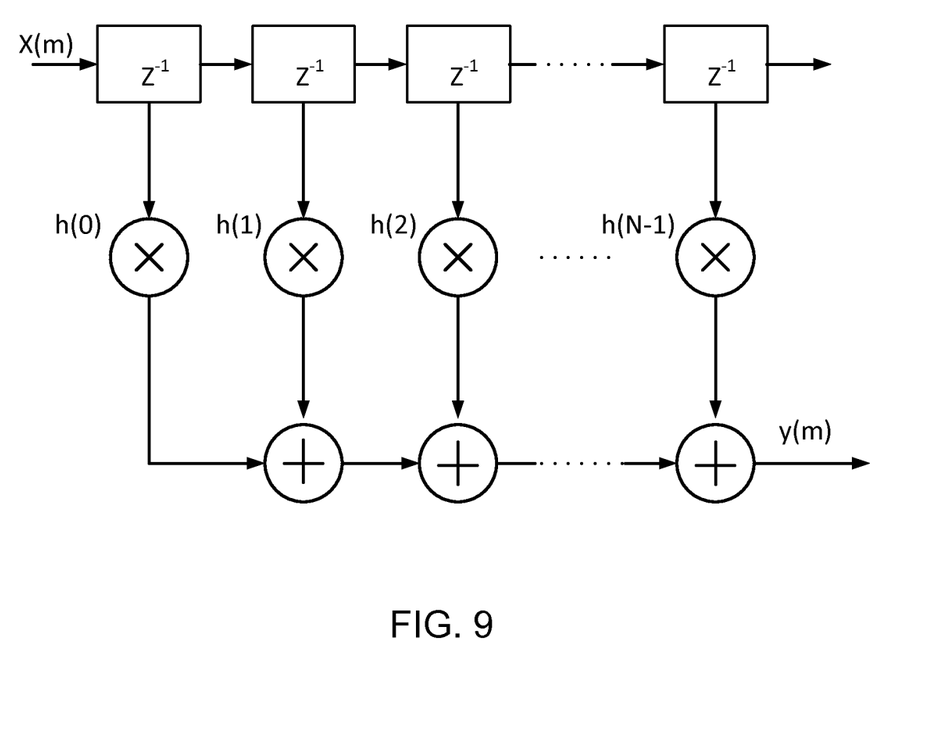
FIG. 9 illustrates an embodiment of the complex asymmetric FIR filter 323.

FIG. 9 illustrates an implementation of the complex asymmetric FIR filter 323. X(m) denotes the $m^{th}$ sample of the input signal, and y(m) denotes the $m^{th}$ sample of the output signal. $Z^{-1}$ denotes the sample delay block. The filter coefficients (h(0), h(1), h(2), . . . , h(N−1)) are asymmetrical. E.g., there is at least one tape position i for which h(i)< >h(N−i−1). The filter coefficients (h(0), h(1), h(2), . . . , h(N−1)) are complex values.

Figure 10:
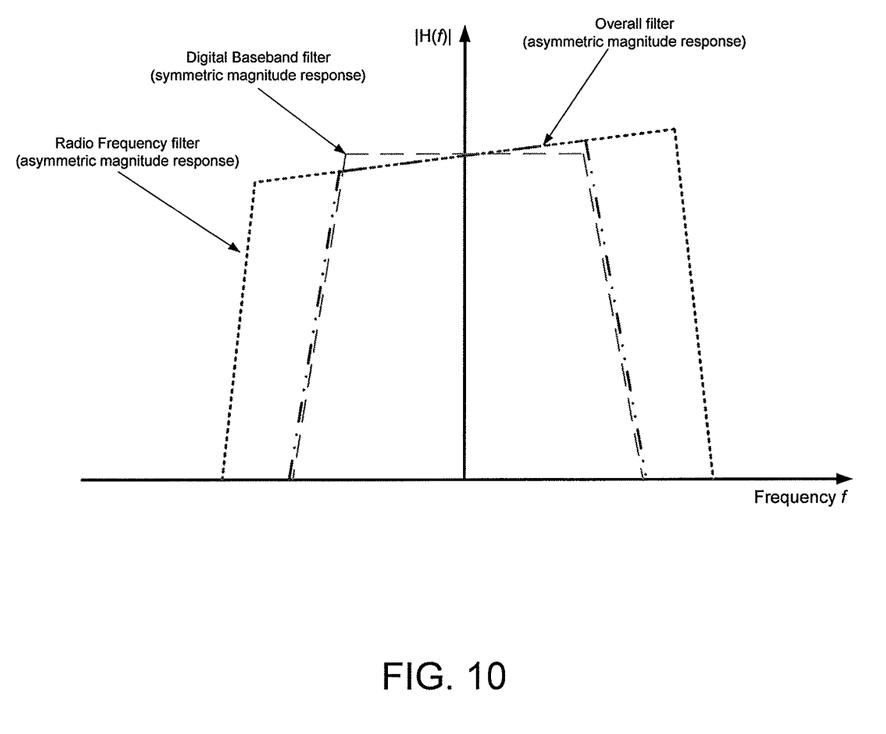
FIG. 10 illustrates the effect using the prior art filter 320.
Figure 11:
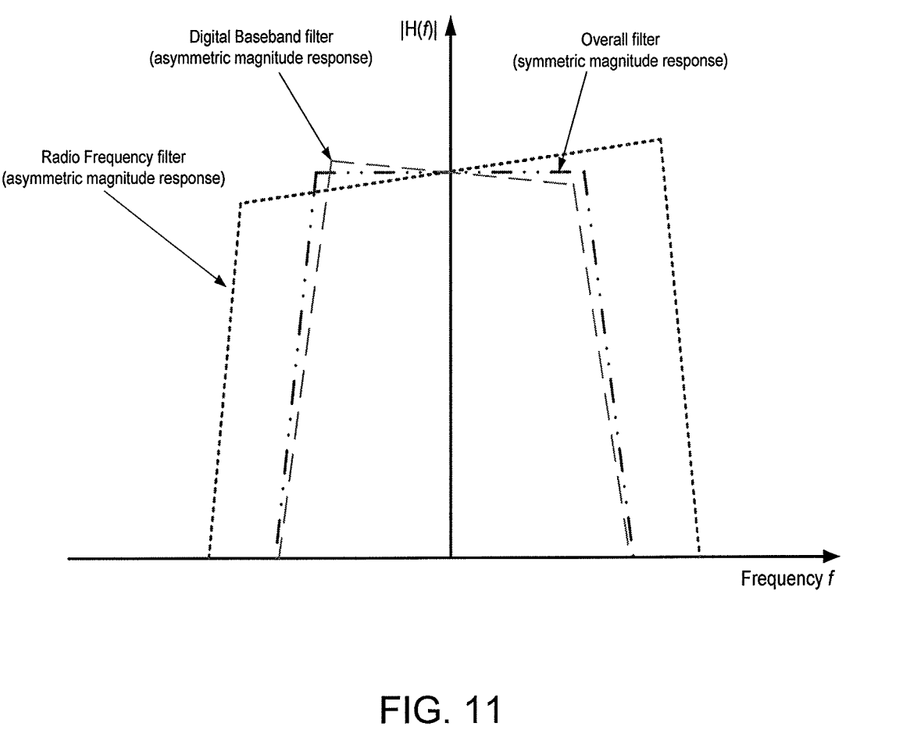
FIG. 11 illustrates the effect of one aspect of present invention using the complex asymmetric FIR filter 323.

FIGS. 9 and 10 illustrate the effect of the embodiment compared with prior art. FIG. 9 illustrates the frequency response (of, e.g., magnitude) of the radio frequency filter, which is asymmetrical. The prior art digital baseband filter (i.e. including the asymmetric FIR 322) shows symmetrical response. As a result, the combination of both filters (overall filter) shows an asymmetrical frequency response similar to the radio frequency filter.

FIG. 10 illustrates that, in contrast, the digital baseband filter (i.e. including the complex asymmetric FIR filter 323) having an asymmetrical frequency response. Thus, by designing the complex asymmetric FIR filter 323 to compensate for the response of the radio frequency filter, the overall filter exhibits a symmetrical frequency response.

The complex filter coefficients can be made software programmable. Such programming allows the receiver to track characteristics of the received signal so as to adapt the configuration of the shaping filter 320 to these characteristics. For example, it is be possible to measure the frequency response of the received signal for a number of different frequency points and use these measurements to detect any undesired asymmetry in the response. Such an asymmetry could then be corrected for by the shaping filter 320 by adapting the frequency response of some of the filtering stages. For example, it would be possible to include one, or more, FIR filters with complex coefficients in 320 and set the coefficients so as to correct for the asymmetry in the frequency response of the received signal.

The signal conditioning stage (e.g., hardware circuit) 330 conditions the I/Q samples generated by the shaping filter 320 such that they can be processed by the demodulation unit 400. For example, the signal conditioning unit 330 may apply digital scaling stages, which may be programmable, so as to set the dynamic range of the output signal in a range acceptable to the demodulation unit 400. The signal conditioning unit 330 may also be configured such that any DC offset present in the received signal is removed.

The measurements unit (e.g., hardware circuit) 340 performs a number of measurements and calculations on the complex I/Q signal throughout the DFE 300. For example, the measurements unit 340 computes the power of the received signal at the different points in the processing chain implemented by the DFE 300 in order to detect the presence of interfering signals such as unwanted adjacent channels. The measurements unit 340 can also be configured to detect undesired asymmetry in the amplitude of the frequency response of the received signal such that the shaping filter 320 can then be adapted to correct for such asymmetry. For example, it is possible to calculate the frequency response of the received signal for 2 frequency points +fm and −fm and estimate any asymmetry in the frequency response from these two measurements. The calculation of such quantities can be implemented at a very low complexity cost if, for example, these measurements are performed at the output of the shaping filter 320 and the frequency points for which the response is calculated correspond to the a quarter of the sampling rate. In such a case, the frequency response values can be calculated without the need for any multiplication.

In this manner, the filter coefficients of the complex asymmetric FIR filter 323 can be adjusted dynamically (i.e., during operation).

Those skilled in the art will recognize improvements and modifications to the preferred embodiments of the present invention. All such improvements and modifications are considered within the scope of the concepts disclosed herein and the claims that follow.

What is claimed is:

1. A radio frequency (RF) receiver comprising:
a first set of mixers receiving an RF signal according to a first communication mode;
a second set of mixers receiving the RF signal according to a second communication mode;
wherein one of the first set and the second set of mixers comprises a first mixer and a second mixer,
wherein a resistance circuit is disposed, and is always in a signal path, between each of the first mixer and the second mixer and a low noise amplifier (LNA),
the RF receiver further comprising:
a digital filter, including a complex filter coefficient, coupled to an output of one of the first and second set of mixers, wherein the digital filter has asymmetrical frequency response,
wherein the complex filter coefficient is set dynamically,
wherein the one of the first and second set of mixers to which the digital filter is coupled is coupled to a polyphase reactive circuit, and
the RF receiver further comprising an additional filter including the polyphase reactive circuit, wherein the frequency response of the digital filter compensates for a frequency response of the additional filter.

2. The RF receiver of claim 1,
wherein the first set of mixers operates at a voltage twice or greater than a voltage operated by the second set of mixers.

3. The RF receiver of claim 1,
wherein the first set of mixers operates on a first set of local oscillator signals, and the second set of mixers operates on a second set of local oscillator signals, and
wherein one of the first set and the second set of local oscillator signals has a voltage swing twice or greater than a voltage swing of another one of the first set and the second set of local oscillator.

4. The RF receiver of claim 1,
wherein the first and second communication modes are 2G standard compliant and 3G standard compliant.

5. The RF receiver of claim 4,
wherein the 2G standard is GSM, and the 3G standard is WCDMA or TD-CDMA.

6. A radio frequency (RF) receiver comprising:
a first set of mixers and a second set of mixers receiving an RF signal, the first set of mixers being configured to receive the RF signal according to a first communication mode, and the second set of mixers being configured to receive the RF signal according to a second communication mode;
a digital filter coupled to an output of one of the first set of mixers and the second set of mixers, wherein the digital filter has asymmetrical frequency response, wherein the asymmetrical frequency response is asymmetric in magnitude of the frequency response,
wherein the digital filter includes a complex filter coefficient set dynamically,
the RF receiver, further comprising:
a polyphase reactive circuit coupled to the output of one of the first set of mixers and the second mixers set of mixers to which the digital filter is coupled; and
an additional filter including the polyphase reactive circuit, wherein the frequency response of the digital filter compensates for a frequency response of the additional filter.

7. The RF receiver of claim 6, wherein a first mixer in the first set of mixers is an Inphase mixer, and a second mixer in the first set of mixers is a Quadrature mixer, and
wherein the Inphase mixer and the Quadrature mixer convert the received RF signal to a different frequency.

8. A method for improving frequency response symmetry of a radio frequency (RF) receiver, comprising:
receiving an RF signal by a first set of mixers and a second set of mixers, the first set of mixers being configured to receive the RF signal according to a first communication mode, and the second set of mixers being configured to receive the RF signal according to a second communication mode;
filtering, by a digital filter having asymmetrical frequency response, output of one of the first set of mixers and the second set of mixers, wherein the asymmetrical frequency response is asymmetric in magnitude of the frequency response, and wherein the digital filter includes a complex filter coefficient set dynamically;
filtering, by an additional filter including a polyphase reactive circuit, the received RF signal; and
compensating a frequency response of the additional filter by the frequency response of the digital filter.

9. The method of claim 8, wherein a first mixer in the first set of mixers is an Inphase mixer, and a second mixer in the second set of mixers is a Quadrature mixer, and further comprising:
converting, by the Inphase mixer and the Quadrature mixer, the received RF signal to a different frequency.

10. The method of claim 8, wherein an output of the polyphase reactive circuit coupled to the output of one of the first set of mixers and the second mixers set of mixers is filtered by the digital filter.

* * * * *